US012750877B2

(12) United States Patent
Lin et al.

(10) Patent No.: US 12,750,877 B2
(45) Date of Patent: Sep. 29, 2026

(54) RESOURCE PRE-EMPTION SIDELINK COMMUNICATION

(71) Applicant: GUANGDONG OPPO MOBILE TELECOMMUNICATIONS CORP., LTD., Dongguan (CN)

(72) Inventors: Huei-Ming Lin, Taipei (TW); Zhenshan Zhao, Dongguan (CN); Qianxi Lu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 437 days.

(21) Appl. No.: 17/728,738

(22) Filed: Apr. 25, 2022

(65) Prior Publication Data

US 2022/0256553 A1 Aug. 11, 2022

Related U.S. Application Data

(63) Continuation of application No. PCT/CN2020/130635, filed on Nov. 20, 2020.

(60) Provisional application No. 62/938,281, filed on Nov. 20, 2019.

(51) Int. Cl.

*H04W 72/56* (2023.01)
*H04W 72/044* (2023.01)
*H04W 72/20* (2023.01)

(52) U.S. Cl.

CPC ......... *H04W 72/56* (2023.01); *H04W 72/044* (2013.01); *H04W 72/20* (2023.01)

(58) Field of Classification Search

None

See application file for complete search history.

(56) References Cited

U.S. PATENT DOCUMENTS

| | | | | |
|---|---|---|---|---|
| 2021/0144750 | A1* | 5/2021 | Cao | H04W 72/0453 |
| 2021/0219268 | A1* | 7/2021 | Li | H04W 72/02 |
| 2021/0385822 | A1* | 12/2021 | Chae | H04W 72/0453 |
| 2022/0256579 | A1* | 8/2022 | Ji | H04L 1/08 |
| 2022/0394560 | A1* | 12/2022 | Yu | H04W 72/02 |
| 2022/0394675 | A1* | 12/2022 | Zhou | H04W 72/20 |

FOREIGN PATENT DOCUMENTS

| | | | |
|---|---|---|---|
| CN | 101005712 | A | 7/2007 |
| CN | 101883436 | A | 11/2010 |
| CN | 108141847 | A | 6/2018 |

(Continued)

OTHER PUBLICATIONS

Extended European Search Report issued in corresponding European application No. 20889695.1, mailed Oct. 4, 2022.

(Continued)

*Primary Examiner* — Saumit Shah
(74) *Attorney, Agent, or Firm* — BAYES PLLC

(57) ABSTRACT

The present disclosure relates to the field of SL resource pre-emption. A method of selecting one or more resources for sidelink, SL, communication for a first user equipment, UE, includes the step of performing a pre-emption procedure to determine if one or more SL resources of SL resources already reserved by the first UE is pre-empted by a second UE, when a priority of the first UE is lower than a priority of the second UE.

14 Claims, 4 Drawing Sheets

(56) References Cited

FOREIGN PATENT DOCUMENTS

WO 2019/157739 A1 8/2019

OTHER PUBLICATIONS

Ericsson, "Resource allocation for Mode-2 transmissions", R1-1912599, 3GPP Tsg-Ran WG1 Meeting #99 Reno, Nv, US 18th - 22nd 2019.
Qualcomm Incorporated, "Sidelink Resource Allocation Mechanism for Nr V2X", R1-1911106, 3GPP Tsg-Ran WG1 #98bis Oct. 14 - 20, 2019 Chongqing, China.
Intel Corporation, "Design of Resource Allocation Mode-2 for Nr V2X Sidelink Communication", R1-1912205, 3GPP Tsg Ran WG1 Meeting #99 Reno, USA, Nov. 18 - 22, 2019.
International Search Report issued in corresponding International Application No. PCT/CN2020/130635, mailed Jan. 25, 2021, 25 pages.
Written Opinion of the International Searching Authority issued in corresponding International Application No. PCT/ CN2020/130635, mailed Jan. 25, 2021, 4 pages.
Communication pursuant to Article 94(3) EPC issued in corresponding European Application No. 20889695.1, mailed Feb. 17, 2025, 8 pages.
First Office action issued in corresponding Korean Application No. 10-2022-7014914, mailed Oct. 10, 2025, 10 pages.
Request for the Submission of an Opinion issued in corresponding Korean Application No. 10-2022-7014914, mailed on Feb. 25, 2026, 10 pages.
"Sidelink resource allocation mechanism mode 2 for Nr V2X", Source: Ntt Docomo, Inc., Agenda Item: 7.2.4.2.2, 3GPP Tsg Ran WG1 #99, R1-1912882, Reno, US, Nov. 18 - 22, 2019.
Communication pursuant to Article 94(3) EPC issued in corresponding European Application No. 20889695.1, mailed on Jul. 16, 2026, 9 pages.

* cited by examiner

RESOURCE PRE-EMPTION SIDELINK COMMUNICATION

CROSS-REFERENCE TO RELATED APPLICATION

This application is a continuation of International Application No. PCT/CN2020/130635 filed on Nov. 20, 2020, the contents of which is incorporated herein by reference in its entirety.

TECHNICAL FIELD

The present disclosure relates to the field of direct sidelink (SL) device-to-device communication. In particular, the present disclosure relates to a method and a user equipment to select one or more resources and resource pre-emption for direct sidelink communication.

BACKGROUND

In the evolution of wireless communication to enable vehicle-to-everything (V2X) communication, the development of next generation V2X communication that is based on the latest 5th generation—new radio (5G-NR) radio access technology is currently under way in the 3rd generation partnership project (3GPP).

Sidelink (SL) device-to-device (D2D) communication is a key-enabling technology for 5G enhanced vehicular-to-everything (V2X) communication. In the development of direct D2D communication (e.g. without signal relay through a base station, i.e. the communication does not traverse a network node, thus lowering the number of entities involved in D2D communication) under the 3GPP, also called or referred to as SL technology, reliability requirements to successfully deliver safety related message packets for, for example, advanced driving use cases over the direct radio link, i.e. the SL link, is extremely high, e.g. up to 99.999%.

During the development of NR-V2X technology, it is identified that higher reliability of sidelink message packets delivery is needed to support advanced V2X use cases, such as fully autonomous driving, sensor data sharing, remote driving, cooperate collision avoidance, and vehicle platooning. Likewise, latency requirements of less than 30 ms have to be meet.

In order to provide more protections or guarantee to transmit high priority message packets, it has been agreed to support the mechanism of sidelink resource pre-emption as part of resource sensing and selection in NR sidelink communication. In general, sidelink resource pre-emption may be considered as a process by which a first UE may be considered as a pre-empted UE, i.e. a UE that hands over SL communication resources to a second UE which may be considered as a pre-empting UE, i.e. a UE that takes over the SL communication resources from the pre-empted UE.

SUMMARY

According to an aspect, a method of selecting one or more resources for sidelink, SL, communication for a first user equipment, UE, the method including: performing a pre-emption procedure to determine if one or more SL resources of SL resources already reserved by the first UE is pre-empted by a second UE, when a priority of the first UE is lower than a priority of the second UE.

According to another aspect, a first user equipment, UE, including a processor and memory, said memory containing instructions executable by said processor, whereby said first UE is operative to provide a procedure allowing the first UE to select one or more resources for sidelink, SL, communication for the first UE, where the procedure provides instructions for performing a pre-emption procedure to determine if one or more SL resources of SL resources already reserved by the first UE is pre-empted by a second UE, when a priority of the first UE is lower than a priority of the second UE.

According to yet another aspect, a non-transitory computer-readable storage medium including instructions which, when executed by a computer, cause the computer to carry out the method described above.

According to yet another aspect, a chip including one or more processors configured to execute program instructions stored in one or more memories to carry out the method described above.

DETAILED DESCRIPTION

The mechanism(s) described above and in more detail below solve technical problems that arise with regard to the SL resource pre-emption procedure between UEs.

Figure 1:
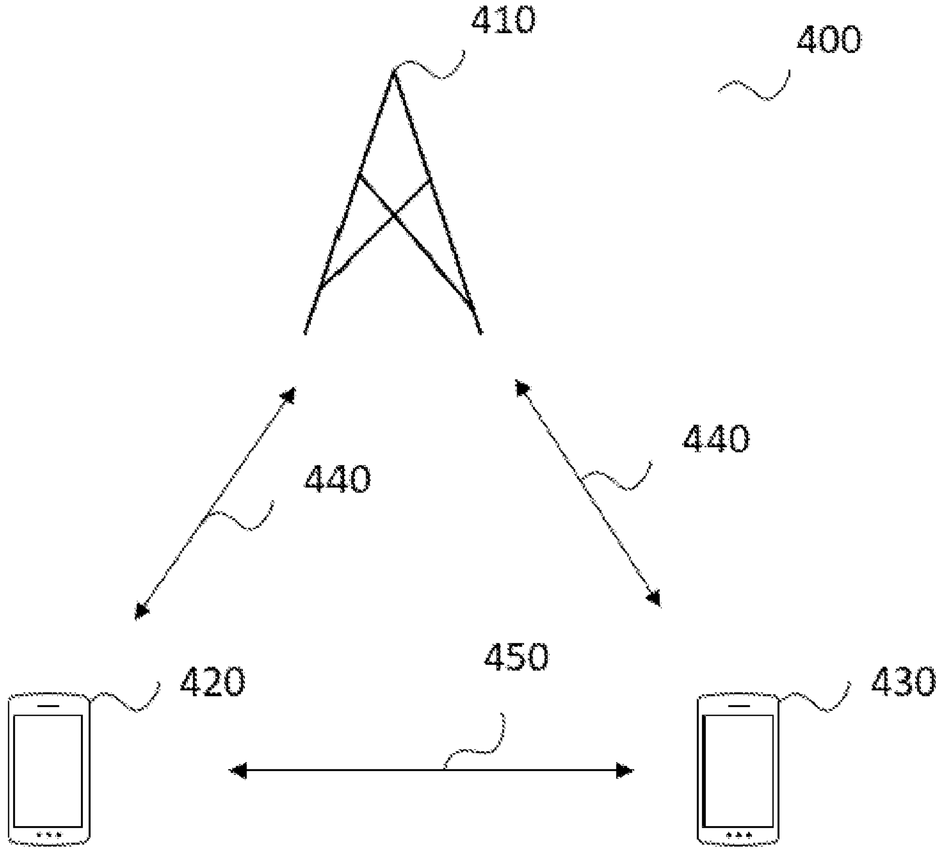
FIG. 1 shows an example of a wireless communication network.

FIG. 1 shows an example of a wireless communication network 400 including one network node 410, a UE 420, and a UE 430. A network node and a UE may be generally be considered a device or node adapted for wireless and/or radio (and/or microwave) frequency communication, and/or for communication utilizing an air interface, e.g. according to a communication standard. The network node 410 may be any kind of network device or radio node of a wireless communication network, such as a base station and/or eNodeB (eNB) and/or gNodeB (gNB) and/or relay node and/or micro or nano or pico or femto node and/or other node. The exemplary wireless communication network 400 of FIG. 1 includes one network node and two UEs. This is, however, not limiting and the wireless communication network 400 may include more or less network nodes and UEs.

The UEs 420 and 430 may represent an end device for communication utilizing the wireless communication network, and/or be implemented as a UE according to a communication standard such as LTE, NR or the like. Examples of UEs may include a phone such as a smartphone, a personal communication device, a mobile phone or terminal, a computer, in particular laptop, a sensor or machine with radio capability (and/or adapted for the air interface), in particular for MTC (Machine-Type-Communication, sometimes also referred to M2M, Machine-To-Machine), D2D (Device-to-Device), or a vehicle adapted for wireless communication. A UE or terminal may be mobile or stationary.

The network node 410 is able to send any kind of Downlink (DL) data to the UEs 420 and 430 via communication links 440 and the UEs 420 and 430 are able to send any kind of Uplink (UL) data to the network node 410 via communication links 440 (such as LTE, NR or the like). Furthermore, the UEs 420 and 430 may directly exchange data between each other using direct SL signaling or SL communication via communication link 450 (such as Bluetooth, Wi-Fi or the like). SL communication is used to support direct communication between the UEs 420 and 430 without the interference of the network node 410. SL communication may be used to operate the UEs 420 and 430 in several modes, like D2D, MTC, V2X etc.

Such communication (D2D, MTC, V2X etc) in combination with cellular network leads to the advantages of support of both direct communications between the UEs and traditional cellular-network based communication and provides migration path to, for example, 5G based systems and services.

Figure 2:
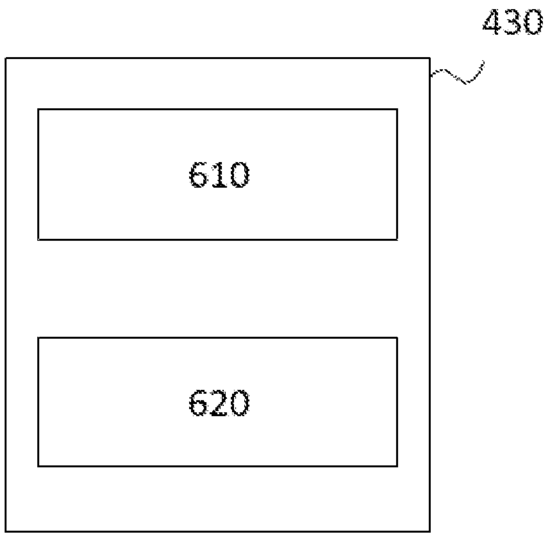
FIG. 2 shows an exemplary configuration for a user equipment according to an embodiment.

FIG. 2 shows an exemplary configuration for the UE 430, the UE being, for example, a first UE being a pre-empted UE, i.e., a UE that hands over SL communication resources to a second UE being a pre-empting UE, i.e. a UE that takes over the SL communication resources from the pre-empted UE. The configuration for the second UE is the same as for the first UE, i.e. the configuration of the first UE and the second UE is as described for the UE 430 in FIG. 2 and a detailed description about the configuration for the UE second is here omitted for conciseness reasons. The UE 430 may include a processor 610 and a memory 620. The processor 610 may be a processing circuitry (which may also be referred to as control circuitry) which may include a controller connected to the memory 620. The skilled person understands that the UE may be provided with a chip, in particular a semiconductor chip, that includes one or more processors 610 and or one or more memories 620. Any module of the UE 430, e.g., a communication module or processing module, may be implemented in and/or executable by, the processing circuitry 610, in particular as module in the controller. The UE 430 may also include radio circuitry (not shown) providing receiving and transmitting or transceiving functionality, e.g., one or more transmitters and/or receivers and/or transceivers, wherein the radio circuitry is connected or connectable to the processing circuitry 610. An antenna circuitry (not shown) of the UE 430 may be connected or connectable to the radio circuitry to collect or send and/or amplify signals. The UE 430 may be adapted to carry out any of the methods for operating the user equipment disclosed herein; in particular, it may include corresponding circuitry, e.g., processing circuitry, and/or modules.

There is generally considered a computer program product including instructions adapted for causing processing and/or control circuitry to carry out and/or control any method described herein, in particular when executed on the processing and/or control circuitry. Also, there is considered a carrier medium arrangement carrying and/or storing a computer program product as described herein.

A carrier medium arrangement may include one or more carrier media. Generally, a carrier medium may be accessible and/or readable and/or receivable by processing or control circuitry. Storing data and/or a computer program product and/or code may be seen as part of carrying data and/or a program product and/or code. A carrier medium generally may include a guiding or transporting medium and/or a storage medium. A guiding or transporting medium may be adapted to carry and/or store signals, in particular electromagnetic signals and/or electric signals and/or magnetic signals and/or optical signals. A carrier medium, in particular a guiding or transporting medium, may be adapted to guide such signals to carry them. A carrier medium, in particular a guiding or transporting medium, may include the electromagnetic field, e.g. radio waves or microwaves, and/or optically transmissive material, e.g. glass fiber, and/or cable. A storage medium may include at least one of a memory, which may be volatile or non-volatile, a buffer, a cache, an optical disc, magnetic memory, flash memory, etc. The storage medium may be a non-transitory computer-readable storage medium.

In general, resources assigned to the SL 450 may be taken from the Uplink (UL), i.e. from the subframes or slots on the UL frequency in Frequency Division Duplex (FDD) or in Time Division Duplex (TDD). UL or SL signaling may be OFDMA (Orthogonal Frequency Division Multiple Access) or SC-FDMA (Single Carrier Frequency Division Multiple Access) signaling. Downlink signaling may in particular be OFDMA signaling. However, signaling is not limited thereto.

A UE may be configured by higher layers with one or more SL resource pools and may be associated with a specific SL resource allocation mode. In the frequency domain, a SL resource pool may include on or more contiguous sub-channels (SC), in some embodiments, a sub-channel has a number of contiguous physical resource blocks (PRBs). The SL resource pool may further by defined by a set of slots.

In general, when a UE attempts to reserve SL communication resources, the UE may lunch a resource selection procedure which may be composed of a resource sensing phase and a resource selection phase. In order to avoid causing interference or collision to existing SL transmissions initiated by other UEs, a transmitting UE, such as UE 420 in FIG. 1, should identify candidate resources which are available (unused by other UEs, such as UE 430 in FIG. 1) to be used by the transmitting UE for SL communications. The candidate resources may include resources unoccupied (unused by other UEs) and may also include resources occupied by ongoing SL transmissions but with an acceptable interference level to the transmitting UE.

More specifically, when data traffic arrives at the transmitting UE, the transmitting UE may set a time instant as a trigger of the resource selection or resource re-selection. Accordingly, a first time window (also referred to as sensing window) and a second window (referred to as selection window) may be set, respectively. During the sensing window, the transmitting UE may measure the reference signal received power (RSRP) of respective subchannels related to other UEs. If either the RSRP on a subchannel does not exceed a specific threshold (the value of this threshold may be determined by the priority level of the transport block (TB) transmission), or a subchannel is not occupied by other SL transmissions, this subchannel may be regarded as a candidate resource in the subsequent or following selection window. Otherwise, a subchannel (SC) is not a candidate resource.

Here, the RSRP may be the power level of a demodulation reference signal (DMRS) on the physical sidelink shared channel (PSSCH) or the physical sidelink control channel (PSCCH), depending on the configuration. That is, to measure the RSRP should know the resources of the PSSCH or the PSSCH transmitted by the other UEs. For this purpose, a transmitting UE may detect the PSCCH and thus receive the sidelink control information SCI transmitted by other UEs to identify which subchannels have been occupied by other SL transmissions. If the ratio of the number of candidate resources to the total number of resources in the selection window (of the SL resource pool) is less than a particular threshold, e.g., 20%, then the above specific threshold may be increased by a specific value, e.g., 3 dB, and the above procedure may be repeated for resource identification.

Further, from reading the contents of SCI transmitted by other SL transmitting UEs, a candidate resource in the selection window may be determined to be (i) occupied or reserved by other UEs, (ii) occupied or reserved by other UEs but having an acceptable interference (RSRP) level, or (iii) or not occupied or reserved by other UEs.

Then, after identifying available SL resources, a transmitting UE may randomize the selection of candidate resources to transmit, for example, the PSCCH, PSSH and physical sidelink feedback channel (PSFCH) during the selection window. When a transmitting UE begins transmitting or launching the PSCCH, PSSH, or PDFCH, the transmitting UE may keep performing resource sensing. In such a case, if the transmitting UE finds that there are other SL transmissions with a higher priority occupying the reserved resources, the transmitting UE may trigger the resource re-selection.

Figure 3:
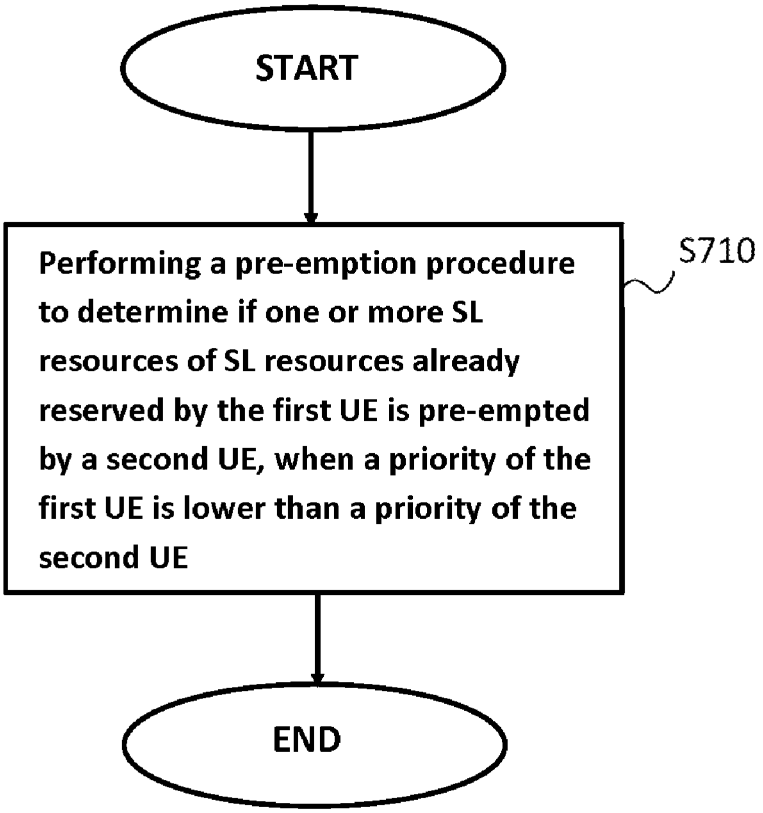
FIG. 3 shows a method of operating a user equipment, the user equipment performing sidelink communication according to an embodiment.

FIG. 3 shows an embodiment of a method of operating a first UE for selecting on or more resources for direct SL communication. The first UE is a pre-empted UE, i.e. a UE that hands over SL communication resources to a second UE being a pre-empting UE, i.e. the second UE takes over the SL communication resources from the pre-empted UE. As explained, direct SL communication may refer to a direct device-to-device communication link.

In addition, the resources for direct SL communication may be resources from a SL resource pool.

The first UE (i.e., the pre-empted UE) is configured to perform a pre-emption procedure to detect pre-emption and/or to perform appropriate processing after pre-emption of SL resources by another UE (i.e., the pre-empting UE).

In some embodiments, the pre-emption procedure according to FIG. 3 may be triggered by a higher layer (e.g., the MAC layer) of the first UE to perform a pre-emption checking to determine whether or not any of its previously reserved SL resources have been pre-empted by another UE. This process may occur based on the higher layer triggering a lower layer (e.g. physical layer) to report a set of candidate resources (which may be a subset of all/total resources within a selection time window (between n+T1 and n+T2)) at slot n, from which the higher layer can select a number of SL resources for transmitting the data packets.

For example, if the higher layer of the first UE requests the lower layer to determine a set of resources from which the higher layer can select SL resources, the higher layer may provide a set of SL resources that may be subject to pre-emption by another UE. In order for the lower layer to determine the set/subset of candidate resources, it may perform resource sensing within a sensing window in the past (for example between n−1000 and n), determine which of resources within the selection window had already been reserved by another UE (for example, from reading resource assignment information and reservation fields in SCI), and exclude these reserved resources from the total set of resources. The remaining resources may then be reported as the set/subset of candidate resources to the layer.

According to step S710 in FIG. 3, the first UE (such as UE 430 in FIG. 1) performs a pre-emption procedure to determine if one or more SL resources of SL resources already reserved by the first UE is pre-empted by a second UE (such as UE 420 in FIG. 1), when (at least) a priority of the first UE is lower than a priority of the second UE.

In some embodiments, the pre-emption procedure is performed by receiving a sidelink control information, SCI, from the second UE. The SCI may be transmitted from the second UE to identify which SL resources of a resource pool (e.g., SC and/or slots) the second UE intends to use/reserve and attempts to take over. In an embodiment, the pre-emption procedure of the first UE may determine whether the resource assignment/reservation information in SCI from a second UE (pre-empting UE) indicates one or more SL resources that overlap with one or more SL resources that had/have already previously reserved by the first UE. In other words, the pre-emption procedure of the first UE may determine whether the second UE indicates to reserve one or more SL resources that are colliding with SL resources that have already been reserved by the first UE.

In some embodiments, the priority of the first UE is a transmission priority of transmitting data packets via SL communication. Based thereon, the pre-emption procedure of the first UE may determine whether the second UE has a higher priority for SL packet transmission on the one or more resources than the first UE. In such a case, the first UE is pre-empted of the one or more SL resources which are handed over to the second UE. In other words, the one or more SL resources which are yielded/handed over to the second UE are excluded from the candidate set (which may be reported to the higher layer).

In addition, during the process of excluding resources from the candidate set, SL resources may be kept or not excluded in the candidate set, in particular those SL resources for which the second UE has lower transmission priority and/or lower received power. This process may be part of the pre-emption procedure of keeping or not excluding resources reserved by other UEs (pre-empting UEs) and these SL resources may be selected for packet transmission by the UE.

In some embodiments, the priority of the second UE, e.g., the reception priority, is received in the SCI, i.e., is included in the SCI from the second UE. In some embodiments, the SCI indicates resource pre-emption information, i.e., SL resource allocation information with regard to time and frequency assignment of SL resources that overlap with the first UE's reserved resource, and which the second UE attempts to reserve/pre-empt.

In some embodiments, the pre-emption procedure triggers a re-selection process to select one or more replacement SL resources. That is, when the first UE (e.g. a lower layer of the first UE, such as the physical layer) determine that one or more SL resources of SL resources already reserved by the first UE are pre-empted by a second UE, as indicated by the SCI, and a priority of the first UE is lower than a priority of the second UE, e.g. the second UE has a higher transmission priority than the first UE, then a re-selection process is triggered (e.g. by a higher layer of the first UE, such as the MAC layer) to select replacement SL resources that may be used instead of the SL resources which had been reserved by the first UE but are reserved/pre-empted by the second UE.

In some embodiments, the re-selection process includes a non-pre-empted portion of the one or more reserved SL resources as part of the re-selection process.

For example, if the first UE had 5 SL resources reserved (e.g., SC1, SC2, SC3, SC4, SC5, each for a particular slot n) and 2 of these SL resources are taken over by the second UE of higher priority, then the 3 remaining SL resources are included as part of the re-selection process. That is, the 3 remaining SL resources may still be considered (remains available) as a candidate resource set for SL communication, and additional SL resources may be selected.

In some embodiments, the re-selection process may drop or skip a planned SL transmission for the pre-empted resources. That is, the SL resources which are reserved/pre-empted by the second UE are not used for the planned or scheduled SL transmission at the first UE. Instead the re-selected SL resources are used for the planned SL transmission.

In some embodiments, the one or more SL resources that are being pre-empted by the second UE is/are less than a specific portion of the already reserved SL resources. In other words, in the above example, if the first UE had 5 SL resources reserved (e.g., SC1, SC2, SC3, SC4, SC5, each for a particular slot n) then a portion of the SL resources being taken over by the second UE is no more than a certain percentage (X %) of the SL already reserved. The certain percentage value (X %) may be, for example, 50%, and thus up to 2 of these SL resources can be taken over by the second UE of higher priority. In some embodiments, the specific portion may be a value that is pre-configured or network configured.

Once the first UE has selected the SL resources and performed an initial transmission of the data packets via SL communication, the first UE may also reserve future SL resources in SCI(s) for its SL (re)transmissions. Similarly, other UEs will try to exclude these SL resources during their resource selection procedure. Although resources are now reserved by the first UE by the above process, they may still be pre-empted by another UE, when the processing of the lower layer is performed by another UE with higher priority transmissions. As such, the first UE may need to perform a pre-emption check to determine a set of resources which may be subject to pre-emption. In an embodiment, the higher layer (MAC layer) may trigger this pre-emption procedure (shortly just) before each SL transmission to check/determine if any of its prior reserved resources have been pre-empted by another UE, as described above. During the pre-emption checking procedure, the higher layer may provide a prior reserved resource set to the lower layer, and may, based on the above processing, subsequently determine if these resources are still part of the remaining candidate resource set for reporting to the higher layer. If any of the prior reserved resources is no longer available, i.e. not part of the candidate set of the candidate resource set to be reported to higher layer, due to SL resource reservation from another UE that has a higher priority and/or its measured received power level is above a certain threshold, then the lower layer reports pre-emption of the resource to the higher layer. In other words, one or more previously reserved SL resource has been pre-empted by another UE and the higher layer should perform a re-selection for this pre-empted resource.

According to another embodiment, when more than one pre-empting UE, e.g. a second and a third second UE, have a higher priority of SL transmission than the first UE (i.e. the pre-empted UE) and perform a processing to pre-empt/take-over an already reserved resource from the first UE, the second and third UEs (pre-empting UEs) may be configured to perform one or more of the followings processes:

A pre-emption indication using sidelink control information (SCI) to indicate resource reservation information from the second and third UEs are transmitted to inform their intention to pre-empt/take-over SL resources, and/or If the second UE's pre-emption indication SCI is sent before the third UE's pre-emption indication SCI and the third UE determines that its packet/message (transmission) priority level is higher than second first UE, then the third UE sends out its pre-emption SCI to take-over the resource that was pre-empted by the second UE, and/or If the third UE determines that its packet/message (transmission) priority level is lower than the second UE's packet/message (transmission) priority level, then the third UE should not send out its pre-emption indication SCI anymore (thus avoiding unnecessary communications).

In another embodiment, when the resource reservation information in a pre-emption indication from a pre-empting UE (e.g. a second or third UE) only partially overlaps with a SL resource previously reserved by the first UE (pre-empted UE), the first UE may perform a pre-emption procedure to determine whether the partial overlapped portion is less than or equal to a certain portion or percentage (X %) of the first UE's reserved resource. Based on this determination the first UE may continue to use the non-overlapped/non-pre-empted portion of the reserved SL resource to transmit its message packet(s) without triggering a resource reselection process. The specific value of the certain percentage (X %) may be 50% or less and this value can be pre-configured or network configurable.

As described above, methods and UEs are described for sidelink resource pre-emption and resource re-evaluation/re-selection decision. In the disclosed methods, a user equipment (UE) may perform a sensing operation in a sidelink (SL) resource pool. The sensing operation may be performed by decoding sidelink control information (SCI) transmitted by other UEs and measuring their associated SL reference signal received power (RSRP) levels to identify SL resource utilization status and identify future reservation of sidelink resources from other UEs.

The UE (pre-empting UE, as described above) may not be able to find empty/available resources during a resource selection window to transmit its message packets and it may be due to a heavily congested SL resource pool and/or due to the fact that the latency requirement/packet delay profile of the message packets is very short and most of the resources within the selection window are already reserved by other UEs.

For this kind of situation, where the pre-empting UE cannot find an empty/available resource to transmit its packet, the pre-empting UE may pre-empt or take over one or more of already reserved sidelink resources from other UEs with lower priorities indicated in their transmitted SCI.

In order for the pre-empting UE to pre-empt or take-over one or some of already reserved resources from another UE (pre-empted UE, as described above), the first UE may transmit an SCI indicating resource reservation information (which is a time and frequency allocation of resources that overlaps with second UE's already reserved resources) to inform about the pre-empting UE's intention to take-over the pre-empted UE's resources (previously reserved by the pre-empted UE).

In a case when the resource reservation information from the pre-empting UE overlaps with most or all of a SL resource previously reserved by the pre-empted UE, once the pre-empted UE is aware of the resource pre-emption/take-over from another UE (the first UE), the pre-empted UE is triggered to perform a resource re-evaluation/reselection process to find a suitable replacement sidelink resource and considers the non-overlapped/pre-empted portion of the already reserved resource to be available during the resource re-evaluation/reselection procedure. Alternatively, the pre-empted UE may simply drop/skip its planned transmission for the overlapped resource.

In a case when there is more than one pre-empting UE (e.g. a second UE and a third UE) who have higher priority message transmission than a first UE (pre-empted UE) and wish to pre-empt or take over an already reserved resource from the first UE, a pre-emption indication via SCI to indicate resource reservation information from each UE's should be transmitted to inform their intention. If the second UE's pre-emption indication SCI is sent before the third UE and the third UE determines its message priority level is even higher than the second UE, then the third UE sends out its pre-emption SCI to take-over the resource that was pre-empted by the second UE. But if the third UE's message priority level is lower than the second UE's message, then the third UE should not send out its pre-emption indication SCI anymore.

In a case when the resource reservation information from the second UE overlaps with only some of a SL resource previously reserved by the third UE, where the partial overlapped portion is less than or equal to a certain percentage (X %) of third UE's the reserved resource, the third UE may still use the non-overlapped/pre-empted portion of the already reserved resource to transmit its message packet without triggering the resource re-evaluation/reselection procedure. Alternatively, the third UE may still trigger the resource re-evaluation/reselection procedure to find a suitable replacement SL resource to transmit its message packet and consider the non-overlapped/pre-empted portion of the already reserved resource to be available during the resource re-evaluation/reselection procedure. The value of X % could be 50% or less and it can be pre-configured or network configurable.

The following describes further embodiments for implementing the disclosed methods.

Figure 4:
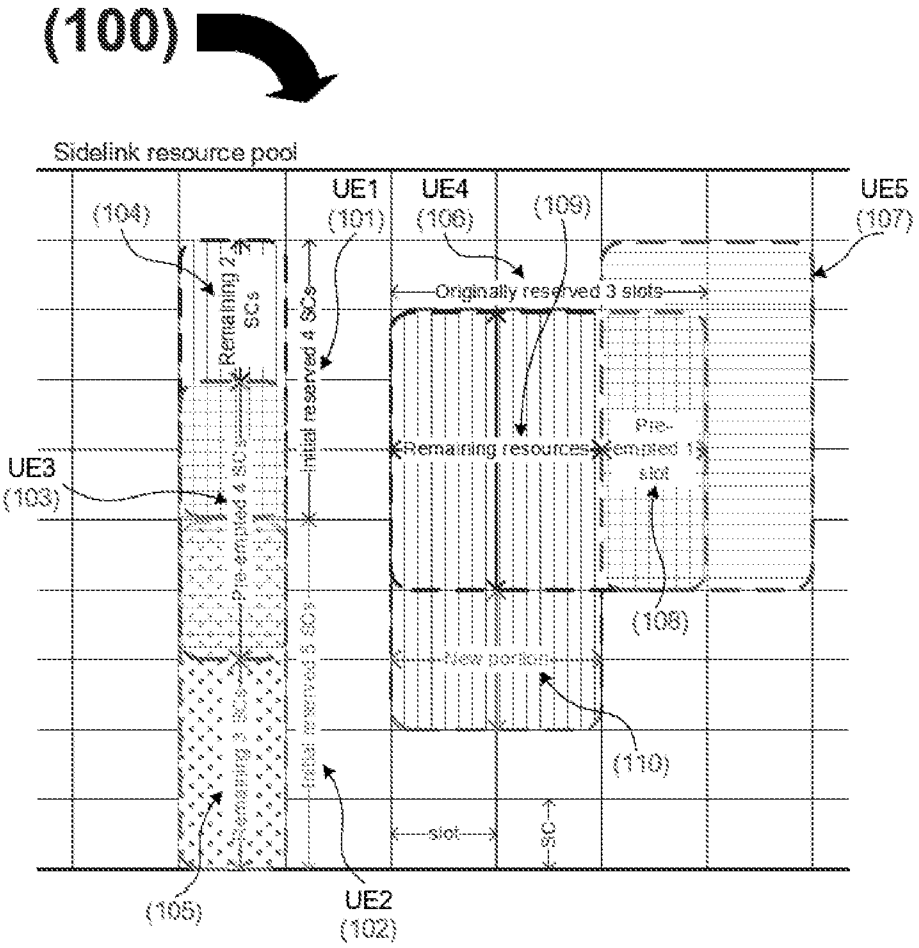
FIG. 4 shows an example of SL resource pre-emption and resources adjustment according to an embodiment.

FIG. 4 shows an embodiment of SL resource pre-emption and resources adjustment. Here, FIG. 4 shows a sidelink resource pool (defining combinations of sub-channels (SCs) and slots) with regard to five UEs, i.e., UE1, UE2, UE3, UE4, and UE5. As further indicated in FIG. 4, the UE1 initially reserved 4 SCs 101 and the UE2 102 initially reserved 5 SCs 102 in the same slot.

In addition, the UE4 had originally reserved 3 slots each for 4 SCs 106.

In reference to diagram 100 in FIG. 4, an exemplary illustration of resource pre-emption from UE3 to partially take-over some of already reserved resources from UE1 and UE2 is shown. For UE1 it initially reserved 4 sub-channels (SCs) of sidelink resources 101, and UE2 initially reserved 5 SCs of sidelink resources 102 for their own transmissions. Since UE3 could not find other available resources and its transmission message priority is higher than those of UE1 and UE2, it pre-empts in total 4 SCs of resources 103, 2 SCs from UE1 and 2 SCs from UE2. This leaves remaining of 2 SCs of resources for UE1 104 and 3 SCs of resources for UE2 105. Since the amount of pre-empted resources from UE1 is 2 SCs, which is 50% of its initially reserved resources 101, the pre-emption from UE3 did not trigger the resource re-evaluation/reselection procedure for UE1 and it continue to use the remaining 2 SCs 104 for its planned transmission.

Similarly, since the amount of pre-empted resources from UE2 is 2 SCs, which is 40% of its initially reserved resources 102, the pre-emption from UE3 did not trigger the resource re-evaluation/reselection procedure for UE2 and it continue to use the remaining 3 SCs 105 for its planned transmission. In this case, since the amount of pre-empted resources for UE1 and UE2 is less than 50% of their initial reservation, UE1 and UE2 decide to use the remaining resources to transmit their original planned message packets. Although the resultant coding rate for these transmissions will be higher than before, but at least the message packets can still be transmitted instead of dropping. The performance can still be recovered from retransmitting those message packets.

For example, for each message packet, a UE can perform (re)transmissions of the same packet up to 32 times (including an initial transmission). So even when one of the (re)transmission resources is pre-empted by another UE, and the message transmitting UE is only able to use the remaining non-pre-empted portion, the decoding performance can still be recovered from the subsequent retransmissions.

In reference to diagram 100 in FIG. 4, a further exemplary illustration of resource pre-emption from the UE5 to partially take-over some of already reserved resources from UE4 is shown.

For UE4, it initially reserved 3 slots of sidelink resources 106 for its own transmission. Since UE5 could not find other available resources and its transmission message priority is higher than that of UE4, it reserves some sidelink resources in 107, for which it pre-empts 1 slot of resources 108 from UE4. This leaves remaining of 2 slots of resources for UE4 109. Since the amount of remaining resources for UE4 may not be enough to guarantee successful decoding at receiver UE, it may decide to trigger a resource re-evaluation/reselection procedure. By retaining the remaining resources 109 and selecting a new portion of sidelink resources 110, the UE4 is able to use the combined resources for its planned transmission of message packet. In this case, the performance of transmitting the message packet for UE4 is not degraded although some of its initially reserved resources where pre-empted by another UE, here UE5. Furthermore, during the re-evaluation/reselection procedure, by retaining/reusing the remaining non-pre-empted resources 109, it may be easier for UE4 to only find a new additional portion, instead of a whole larger block of SL resources.

According to a further embodiment, the remaining/non-pre-empted portion of reserved resources of another UE should be continuous in one block in both time and frequency domain due to AGC simplification, PAPR constraints and indication of non-contiguous SL resource allocation in SCI is not supported.

According to a further embodiment, for the pre-empted UE to utilize the remaining portion of already reserved resources, transport block size (TBS) should still be calculated based on the size of previously reserved resources (assuming no pre-emption).

According to a further embodiment, in order to avoid triggering of sidelink resource re-selection/re-evaluation or dropping of a sidelink message transmission for a sidelink resource pre-empted UE, the sidelink pre-empting UE may pre-empt or take over up to a certain percentage (X %) of previously reserved/indicated sidelink resources from another UE (i.e. pre-empted UE), where the value of X is pre-configurable or network configurable, and/or the sidelink pre-empted UE may continue to utilize the remaining non-pre-empted portion of previously reserved sidelink resources for its planned transmission.

According to a further embodiment when sidelink data transmission performance needs to be maintained and resource re-evaluation/re-selection procedure is triggered, the pre-empted UE may retain the non-pre-empted portion of previously reserved resources when selecting a new set of resources for transmission.

As mentioned above, the UEs 420 and 430 may perform certain operations or processes described herein using the circuitry discussed with regard to FIG. 2 above. These operations may be performed in response to the processing circuitry or processor executing software instructions contained in a computer-readable medium, such as the main memory, ROM and/or storage device. A computer-readable medium may be defined as a physical or a logical memory device.

For example, a logical memory device may include memories within a single physical memory device or distributed across multiple physical memory devices. Each of the main memory, ROM and storage device may include computer-readable media with instructions as program code. The software instructions may be read into the main memory for another computer-readable medium, such as a storage device or from another device via the communication interface.

Further, the software instructions contained in the main memory may cause processing circuitry including a data processor, when executed on processing circuitry, to cause the data processor to perform operations or processes described herein. Alternatively, hard-wired circuitry may be used in place or on in combination with the software instructions to implement processes and/or operations described herein. Thus, implementations described herein are not limited to any specific combination of hardware and software.

The physical entities according to the different embodiments of the disclosure, including the elements, units, modules, nodes and systems may include or store computer programs including software instructions such that, when the computer programs are executed on the physical entities, steps and operations according to the embodiments of the disclosure are carried out, i.e. cause data processing means to carry out the operations. In particular, embodiments of the disclosure also relate to computer programs for carrying out the operations and steps according to the embodiments of the disclosure, and to any computer-readable medium storing the computer programs for carrying out the above-mentioned methods.

Where the term module is used, no restrictions are made regarding how distributed these elements may be and regarding how gathered these elements may be. That is, the constituent elements, modules, units of the UEs 420 and 430 may be distributed in different software and hardware components or other devices for bringing about the intended function. A plurality of distinct elements and modules may also be gathered for providing the intended functionality.

For example, the elements, modules, and functions of the nodes may be realized by a microprocessor and a memory similar to the above node including a bus, a processing unit, a main memory, ROM, etc. The microprocessor may be programmed such that the above-mentioned operations, which may be stored as instructions in the memory, are carried out.

Further, the elements, modules, and units of the apparatus may be implemented in hardware, software, Field Programmable Gate Arrays (FPGAs), application-specific integrated circuits (ASICs), firmware or the like.

It will be apparent to those skilled in the art that various modifications and variations can be made in the entities and methods of this disclosure as well as in the construction of this disclosure without departing from the scope or spirit of the disclosure.

The disclosure has been described in relation to particular embodiments and examples which are intended in all aspects to be illustrative rather than restrictive. Those skilled in the art will appreciate that many different combinations of hardware, software and/or firmware will be suitable for practicing the present disclosure.

Moreover, other implementations of the disclosure will be apparent to those skilled in the art from consideration of the specification and practice of the disclosure disclosed herein. It is intended that the specification and the examples be considered as exemplary only. To this end, it is to be understood that inventive aspects lie in less than all features of a single foregoing disclosed implementation or configuration. Thus, the true scope and spirit of the disclosure is indicated by the following claims.

What is claimed is:

1. A method of selecting one or more resources for sidelink, SL, communication for a first user equipment, UE, the method comprising:

performing a pre-emption procedure to determine if one or more SL resources of SL resources, already reserved by the first UE using resource assignment information and a reservation field in a first sidelink control information (SCI), is pre-empted by a second UE, when a priority of the first UE is lower than a priority of the second UE, and triggering a resource re-selection procedure to select a replacement resource for SL transmission, wherein a remaining or non-pre-empted portion of the SL resources already reserved by the first UE is included as part of the resource re-selection procedure and the remaining or non-pre-empted portion of the SL resources reserved by the first UE is continuous in time and frequency domains.

2. The method of claim 1, wherein the pre-emption procedure is performed by receiving a second SCI from the second UE.

3. The method of claim 2, wherein the priority of the second UE is received in the second SCI.

4. The method of claim 2, wherein the second SCI indicates assignment of time and frequency resources that overlap with the one or more SL resources of SL resources already reserved by the first UE.

5. The method of claim 1, wherein the priority of the first UE is a transmission priority.

6. The method of claim 1, wherein the re-selection process drops or skips a planned SL transmission for the one or more of the pre-empted resources.

7. A first user equipment, UE, comprising a processor and memory, said memory containing instructions executable by said processor, whereby said first UE is operative to provide a procedure allowing the first UE to select one or more resources for sidelink, SL, communication for the first UE, wherein the procedure provides instructions for performing a pre-emption procedure to determine if one or more SL resources of SL resources, already reserved by the first UE using resource assignment information and a reservation field in a first sidelink control information (SCI), is pre-empted by a second UE, when a priority of the first UE is lower than a priority of the second UE, and triggering a resource re-selection procedure to select a replacement resource for SL transmission, wherein a remaining or non-pre-empted portion of the SL resources already reserved by the first UE is included as part of the resource re-selection procedure and the remaining or non-pre-empted portion of the SL resources reserved by the first UE is continuous in time and frequency domains.

8. The first UE according to claim 7, wherein the pre-emption procedure is performed by receiving a second SCI from the second UE.

9. The first UE according to claim 8, wherein the priority of the second UE is received in the second SCI.

10. The first UE according to claim 8, wherein the second SCI indicates assignment of time and frequency resources that overlap with the one or more SL resources of SL resources already reserved by the first UE.

11. The first UE according to claim 7, wherein the priority of the first UE is a transmission priority.

12. The first UE according to claim 7, wherein the re-selection process drops or skips a planned SL transmission for the one or more of the pre-empted resources.

13. A non-transitory computer-readable storage medium comprising instructions which, when executed by a computer, cause the computer to carry out operations of:

performing a pre-emption procedure to determine if one or more SL resources of SL resources, already reserved by the first UE using resource assignment information and a reservation field in a first sidelink control information (SCI), is pre-empted by a second UE, when a priority of the first UE is lower than a priority of the second UE, and triggering a resource re-selection procedure to select a replacement resource for SL transmission, wherein a remaining or non-pre-empted portion of the SL resources already reserved by the first UE is included as part of the resource re-selection procedure and the remaining or non-pre-empted portion of the SL resources reserved by the first UE is continuous in time and frequency domains.

14. A chip, comprising one or more processors configured to execute program instructions stored in one or more memories to carry out operations of:

performing a pre-emption procedure to determine if one or more SL resources of SL resources, already reserved by the first UE using resource assignment information and a reservation field in a first sidelink control information (SCI), is pre-empted by a second UE, when a priority of the first UE is lower than a priority of the second UE, and triggering a resource re-selection procedure to select a replacement resource for SL transmission, wherein a remaining or non-pre-empted portion of the SL resources already reserved by the first UE is included as part of the resource re-selection procedure and the remaining or non-pre-empted portion of the SL resources reserved by the first UE is continuous in time and frequency domains.

* * * * *